US012753880B2

(12) United States Patent
Bilak et al.

(10) Patent No.: US 12,753,880 B2
(45) Date of Patent: Oct. 6, 2026

(54) COMPRESSED HYDROGEN AND AIR POWER SYSTEM

(71) Applicant: CleanTech Geomechanics Inc., Calgary (CA)

(72) Inventors: Roman A. Bilak, Calgary (CA); Maurice B. Dusseault, Calgary (CA)

(73) Assignee: CLEANTECH GEOMECHANICS INC., Calgary (CA)

( * ) Notice: Subject to any disclaimer, the term of this patent is extended or adjusted under 35 U.S.C. 154(b) by 343 days.

(21) Appl. No.: 18/287,450

(22) PCT Filed: Apr. 19, 2022

(86) PCT No.: PCT/CA2022/050596
§ 371 (c)(1),
(2) Date: Oct. 18, 2023

(87) PCT Pub. No.: WO2022/221943
PCT Pub. Date: Oct. 27, 2022

(65) Prior Publication Data

US 2025/0320963 A1 Oct. 16, 2025

Related U.S. Application Data

(60) Provisional application No. 63/176,868, filed on Apr. 19, 2021.

(51) Int. Cl.
*B65G 5/00* (2006.01)
*F17C 1/00* (2006.01)

(52) U.S. Cl.
CPC ................ *F17C 1/007* (2013.01); *B65G 5/00* (2013.01); *F17C 2221/012* (2013.01); *F17C 2223/0123* (2013.01); *F17C 2223/036* (2013.01)

(58) Field of Classification Search
CPC . F17C 1/007; B65G 5/00; E21B 41/00; E21B 41/005; E21B 41/0057
See application file for complete search history.

(56) References Cited

U.S. PATENT DOCUMENTS 3,541,803 A 11/1970 Young
5,207,530 A * 5/1993 Brooks .................. F17C 1/007 405/53

(Continued)

FOREIGN PATENT DOCUMENTS

EP 3792467 A1 3/2021
PL 235565 B1 9/2020

(Continued)

OTHER PUBLICATIONS

First Examination Report issued in connection with Saudi Arabia patent application No. GB2317626.6, dated Jun. 30, 2024, 14 pages.
Second Examination Report issued in connection with Saudi Arabia patent application No. GB2317626.6, dated Jun. 2, 2025, 10 pages.
Extended European search report issued in connection with EP application No. 22790629.4 dated Feb. 13, 2025,10 pages.

(Continued)

*Primary Examiner* — Frederick L Lagman
(74) *Attorney, Agent, or Firm* — Klintworth & Rozenblat LLP

(57) ABSTRACT

A system for fluid storage includes a first cased-wellbore vessel (CWV) provided in a subsurface comprising surrounding rock formation, the surrounding rock formation having geomechanical properties that provide stiffness and in situ confining stress to the first CWV; and a fluid comprising compressed hydrogen gas or hydrogen liquid is stored in the first CWV. Furthermore, using the CWVs in a system for energy storage, energy recovery and generating electrical power for generating electrical power from a sequential expansion of the compressed air and the compressed hydrogen gas or ammonia fluid, and combustion of the compressed hydrogen gas or ammonia fluid.

24 Claims, 7 Drawing Sheets

(56) References Cited

U.S. PATENT DOCUMENTS

| | | | | | |
|---|---|---|---|---|---|
| 5,333,465 | A * | 8/1994 | McBride | F17C 1/007 | |
| | | | | 137/264 | |
| 6,840,709 | B2 * | 1/2005 | Dahlem | E21F 17/16 | |
| | | | | 405/53 | |
| 9,109,751 | B2 * | 8/2015 | Schimp | F17C 5/06 | |
| 9,896,269 | B2 * | 2/2018 | Williams | B65G 5/00 | |
| 10,337,669 | B2 * | 7/2019 | Mercer | F17C 5/06 | |
| 10,837,601 | B2 * | 11/2020 | Mercer | B65G 5/00 | |
| 2006/0054318 | A1 * | 3/2006 | Sarada | E21B 41/0057 | |
| | | | | 166/266 | |
| 2009/0322090 | A1 | 12/2009 | Wolf | | |
| 2013/0336721 | A1 | 12/2013 | Mcbride et al. | | |
| 2016/0138735 | A1 | 5/2016 | Strybos | | |
| 2021/0024290 | A1 | 1/2021 | Bilak et al. | | |

FOREIGN PATENT DOCUMENTS

| | | | |
|---|---|---|---|
| WO | WO2019178679 | A1 | 9/2019 |
| WO | WO2022025994 | A1 | 2/2022 |

OTHER PUBLICATIONS

Examination Report issued in connection with UK patent application No. GB2317626.6 dated Aug. 12, 2025, 03 pages.

International Search Report and Written Opinion for PCTCA2022050596 mailed dated Jun. 30, 2022, 10 pages.

Examination Report issued in connection with UK patent application No. GB2317626.6 dated Feb. 21, 2025, 4 pages.

* cited by examiner

COMPRESSED HYDROGEN AND AIR POWER SYSTEM

CROSS-REFERENCE TO RELATED APPLICATIONS

This application claims priority to U.S. provisional patent application Ser. No. 63/176,868, filed Apr. 19, 2021, which is hereby incorporated by reference in its entirety.

FIELD

The present application relates generally to energy storage and recovery, in particular to systems and methods for energy storage and recovery.

BACKGROUND

With the growing global demand and interest in $H_2$, its production is expected to increase, mainly to utilize it as an alternative to hydrocarbon-based fuel. Storing hydrogen in a Compressed Gaseous Hydrogen (CG $H_2$) form is the most common approach to store a large quantity of $H_2$. CG $H_2$ is usually stored in tanks, which can withstand the high pressure that can range from 17 MPa to 70 MPa (170 bar to 700 bar). Typically, the storage tanks are located above ground or shallow underground (a few meters depth) and are mainly made of steel, but some tanks are made of carbon fibre lined with aluminum, steel, or specific polymers to reduce the tanks' weight for some applications and conditions. Such surface or near-surface tanks may also be encased in concrete to provide structural strength.

Because of the nature of the CG $H_2$ storage facilities and $H_2$, there are risks associated with explosions and storage vessel embrittlement that can induce undesirable consequences. As well, the storage tanks and underground storage facilities are limited to certain geographic and geological features, such as the presence of large land space or underground cavern feasibility.

SUMMARY

The present application stores CG $H_2$ inside a cased-wellbore storage (CWS) system to improve the safety of storage hydrogen and mitigate storage vessel limitations such a surface footprint, structural design and embrittlement.

The cased-wellbore storage (CWS) system in the present application is configured to store compressed hydrogen or ammonia fluid deep underground in a closed system that removes the possibility of interaction between the stored gases and the surrounding environment. The hydrogen and ammonia are to be stored in separate storage vessels.

Storing compressed hydrogen or ammonia inside a cased wellbore allows installation of the storage facilities at various nodes of hydrogen and ammonia supply chains independent of geological and geographical conditions.

Cased-wellbore storage (CWS) for compressed hydrogen and ammonia in the present application is a high-volume, high-volume density, high-pressure, high-temperature, high-energy efficiency storage system. Energy efficiency refers to energy density per volume expressed as MJ/L or kWh/L.

The fluid storage system for compressed hydrogen and ammonia liquid provides a versatile storage solution that has multiple applications including compressed gas-to-power systems, energy storage systems, shipment facilities and transportation systems.

In an aspect of the present application, there is provided a system for fluid storage, including a first cased-wellbore vessel (CWV) provided in a subsurface comprising surrounding rock formation, the surrounding rock formation having geomechanical properties that provide stiffness and in situ confining stress to the first CWV; and a fluid comprising compressed hydrogen gas or hydrogen liquid is stored in the first CWV.

In another aspect of the present application, there is provided a system for fluid storage including: a cased-wellbore vessel (CWV) provided in a subsurface comprising surrounding rock formation, the surrounding rock formation having geomechanical properties that provide stiffness and in situ confining stress to the CWV; and a fluid comprising ammonia liquid or ammonia gas stored in the CWV at a pressure up to 50 MPa and a temperature from 20° C. to 250° C.

In another aspect of the present application, there is provided a system for energy storage and energy recovery and generating electrical power including: two or more cased-wellbore vessels (CWVs) provided in a subsurface for separately storing compressed air and compressed hydrogen gas or ammonia fluid; and an expansion and combustion system provided at surface in sealed, fluid communication with the two or more CWVs for generating electrical power from a sequential expansion of the compressed air and the compressed hydrogen gas or ammonia fluid, and combustion of the compressed hydrogen gas or ammonia fluid.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
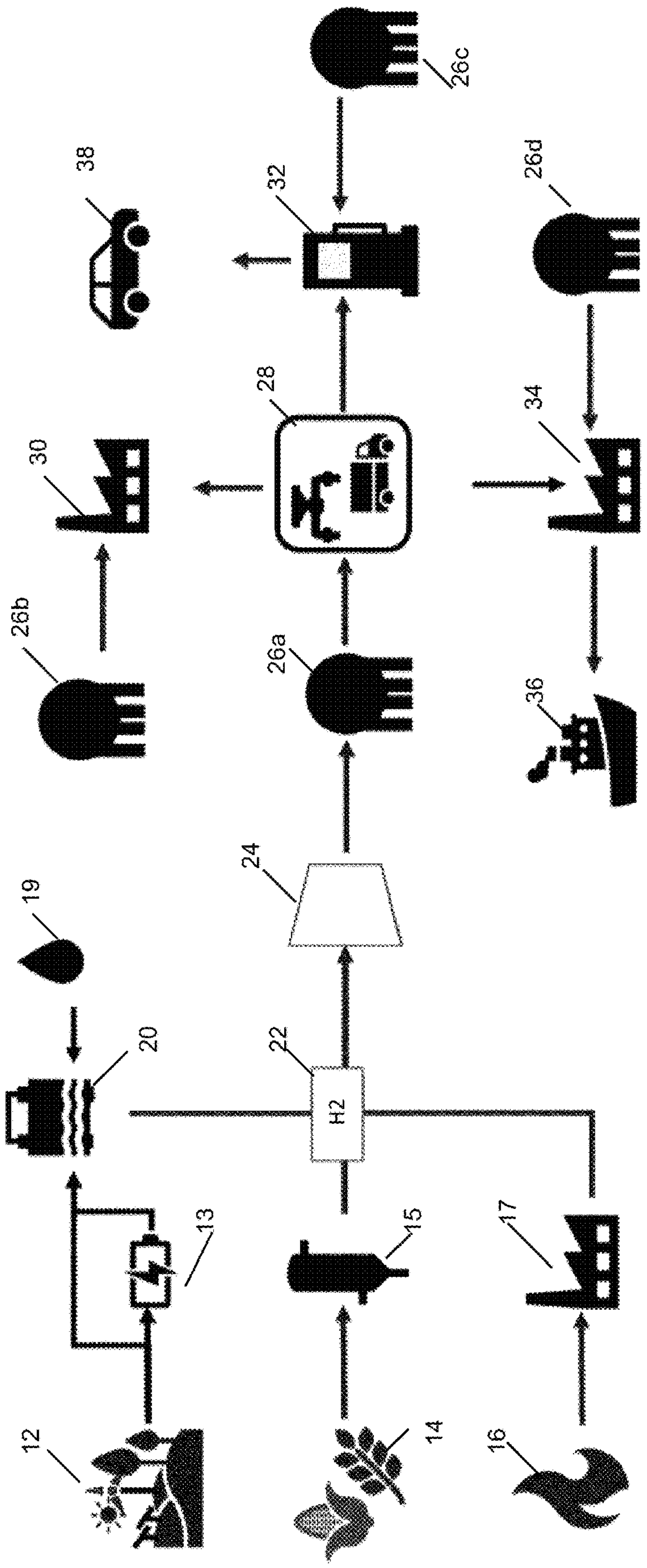
FIG. 1 is a diagram illustrating a hydrogen supply chain, according to an example of the present application.

FIG. 1 is a diagram illustrating a hydrogen supply chain. $H_2$ can be generated in various manners. In the example of FIG. 1, $H_2$ can be generated by an electrolysis process 20 by electrolyzing water 19, using energy generated from renewable energy sources 12, such as solar power, wind power, etc., or energy stored in a short-term energy storage system 13, such as a battery. $H_2$ can also be generated from biogas 14 using a pyrolysis or gasification process 15. As well, $H_2$ can be generated from a steam methane reforming process 17 by natural gas 16.

The generated $H_2$ may be compressed or liquefied using a compression or liquefaction process 24. The compressed or liquefied $H_2$ may be stored at one or more energy storage vessels, such as hydrogen storage 26*a*, 26*b*, 26*c*, and 26*d*. The stored $H_2$ can be transferred to selected locations by transportation 28. For example, $H_2$ can be transported to a hydrogen power plant 30 for generating electrical power; $H_2$ can be transported by shipment or export facility 34 for transporting by hydrogen carrier 36; and $H_2$ can be transported to a fuel station 32 for use by hydrogen fuel cell vehicle (HFCV) 38. $H_2$ in the hydrogen storage 26*b* and 26*c* can also be respectively directly used at a hydrogen power plant for generating power, and at a fuel station for use by HFCV 38.

In the example of FIG. 1, for the practicability and feasibility of a "Hydrogen Economy", $H_2$ storage is crucial for the $H_2$ supply chain at various stages. Notably, large-scale $H_2$ storage is required for pre- and post-transportation (local and overseas) of H2, shipment/export facility 34, and hydrogen power plant 30. $H_2$ storage with smaller capacity is needed for HFCV 38 and $H_2$ fueling stations 32. At each of the storage nodes 26*a*, 26*b*, 26*c*, and 26*d*, the CWS can be utilized as an example embodiment of the present application.

One advantage of $H_2$ as a fuel is its high energy density value per mass (also known as specific energy). Energy density of $H_2$ in terms of Joule/kilogram is much higher than batteries, pumped hydro, or compressed air energy storage. $H_2$, for the same volume and at the same pressure, has about 100 times the energy density of compressed air. Higher pressure $H_2$ has higher energy density than lower pressure $H_2$. For instance, the specific energy of $H_2$ is 142 MJ/kg at 1 atm/25° C., which is the highest among abundant elements and three times higher than gasoline (approx. 44 MJ/kg). The challenge, however, emerges from its high volume-to-mass ratio. Under normal temperature and pressure, 1 kg of $H_2$ occupies about 12 $m^3$ of volume and its energy content is about 33.5 kWh/kg and a volume (liquid $H_2$) energy density of approx. 8 MJ/L equivalent to approx. 2.0 kWh/L. As a reference, gasoline energy content is about 12 kWh/kg and a volume energy density of approx. 32 MJ/L equivalent to approx. 9.0 kWh/L. Hence, it is desirable to increase the volume density of $H_2$ to be considered as a competitive fuel.

Figure 2:
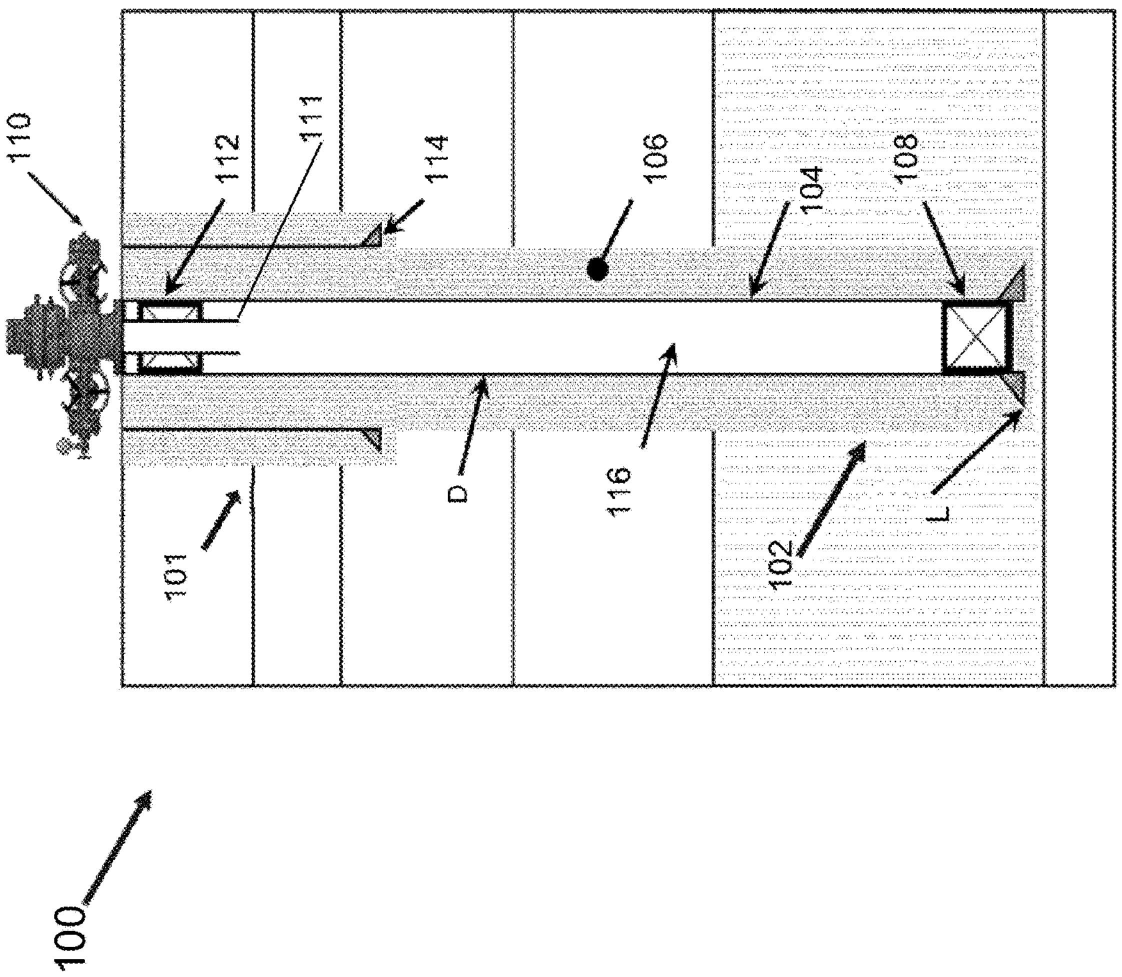
FIG. 2 is a cross-sectional view of a cased-wellbore vessel (CWV) for fluid storage, according to an embodiment of the present application.

In an example, the storage vessel 26*a*-26*d* in FIG. 1 can be one or more cased-wellbore vessels (CWVs) for energy storage in the form of a fluid. In the present application, the term fluid includes gas and liquid. The gas may include gaseous air, $H_2$, or ammonia ($NH_3$), and liquid may include liquefied $H_2$ or $NH_3$. FIG. 2 illustrates an exemplary configuration of a CWV 100 for fluid storage. In some examples, the CWV 100 is configured to store high-pressure, high-temperature fluid.

The CWV 100 is formed in a wellbore 102 provided in a subsurface formation(s) 101. The CWV 100 comprises one or more casings such as inner casing 104 and optionally outer casing 114, cement 106, a basal plug 108, a wellhead 110, and a top seal and valve 112.

The wellbore 102 is configured to include surrounding rock formations 101 that have geomechanical properties to provide stiffness and in situ confining stress to the CWV 100. The in situ confining stress allows in part high pressure and high temperature fluid to be stored in the CWV 100. The wellbore 102 may be formed by drilling in a subsurface formation 101 containing substantially any type of rock or sediment. Oilfield rotary drilling technology may be used to drill the wellbore 102 in sedimentary rock. Air hammer drilling may be used to drill the wellbore 102, providing for more rapid drilling in dense, low permeability rocks such as granites or dense sediments.

In some examples, abandoned but unplugged oil and gas wellbores may be reconditioned to serve as CWV wellbores 102, or as supplements to a drilled array of wellbores 102.

In the example of FIG. 2, the wellbore 102 may be a vertical wellbore formed by drilling into subsurface formations 101. The wellbore 102 may be drilled to a depth L from 100 meters or more, such as depths of 1000 to 3000 meters. In an example, the wellbore 102 has a diameter of 50 cm. The depth L of the wellbore can vary depending on the volumetric capacity of the CWV 100 required for energy storage. In some examples, the wellbore 102 and the CWV 100 may have different orientations, such as inclined or horizontal, dimensions in inner diameter D and length L to meet the particular energy storage requirements.

The wellbore 102 is cased with one or more inner casing 104 and optionally outer casing 114. The inner casing 104 that is exposed to fluid is configured to be corrosion resistant. The inner casing 104 may be formed with material that can sustain predetermined pressure and temperature, such as a pressure up to 100 MPa and a temperature up to 350° C. When the outer casing 114 is used in the CWV 100, the outer casing 114 is placed to surround an upper portion of inner casing 104 from the surface of the group to a predetermined length. The outer casing 114 provides additional confinement and structure support to the inner casing 104. For example, the inner casing 104 may be made from metal, including high-grade steel, such as P110 or Q125 grade steel casing. Because of the in situ confinement, the casing 104 may take pressures up to 100 MPa with negligible safety risk because the entire CWV 100 is formed under the ground.

The outer case 114 is placed to surround an upper portion of inner casing 104 to a predetermined length from the surface of the ground. The outer casing 114 provides additional structure support to the inner casing 104. The inner casing may be made from metal and may be made from the same material as inner casing 104. Cement 106 can be used to cement the inner casing 104 with the surrounding subsurface formation 101 including rock formation, and to cement the outer casing 114 with the surrounding subsurface formation 101 including rock formation, and with the inner casing 104. The cement 106 is corrosion resistant and/or heat-insulating. For example, cement 106 is a highly foamed cement that sustains bubbles within the cement as the cement 106 sets. The cement 106 can also be a cement formulated with a high percent of vermiculite, small hollow glass spheres, or other similar agent that reduces the thermal conductivity of the cement around the casing 104. If the CWV 100 is configured to store high temperature fluid, a high temperature cement with up to 70% silica ($SiO_2$) can be used to provide thermal resistance.

The basal plug 108 is installed at the bottom end of the casing 104 to seal the bottom of the casing 104, so that the fluid stored in the space 116 created by the CWV 100 is prevented from leaking out from the bottom of the casing 104. The basal plug 108 is made from materials that operably sustain the pressure and temperature of the fluid stored in the CWV 100. The basal plug 108 is made from material capable of withstanding a predetermined pressure, such as up to 100 MPa while confined in the surrounding subsurface formation 101. In an example, the basal plug 108 is made from metal.

The wellhead 110 is securely mounted at the top end of the casing 104. The wellhead 110 is configured to allow injection of the fluid into the space 116 formed within the CWV 100 for energy storage and discharge the fluid from the space 116 for energy recovery. The wellhead 110 may be a manifold having one or more valves or fluid flow regulators that allow the fluid in the CWV 100 to be properly managed. In some examples, the manifold, for example by turning on or off the valves, selectively allows the fluid from a compressor to be injected into the CWV 100 for storage through the tubing 111 fluid-tightly connected to the wellhead 110. In some examples, the manifold may, for example by turning on or off the valves, selectively allow the stored fluid to be discharged from the CWV 100, through the tubing 111, for example, to an expansion system for energy recovery and power generation (see FIG. 3A). In an example, the tubing 111 may have a diameter of 23 cm or less.

The top seal and valve 112 may be installed between the tubing 111 and a top portion of the casing 116 in a fluid-tight manner. For example, the top seal and valve 112 may be mounted at about 20-50 meters beneath the ground surface. As the top seal and valve 112 are typically located below the ground surface and below the wellhead 110, this arrangement also improves the safety of the CWV 100 in energy storage.

The casing 104, the basal plug 108, the wellhead 110, and the top seal 112 define the fluid-tight volume or space 116 for storing the fluid within CWV 100 for fluid storage. In some examples, the internal diameter of the casing 104 is about D=30 cm. The diameter of the casing 104 can vary depending on the volumetric capacity of the CWV 100 required for fluid storage and can be up to 50 cm. When D=30 cm, the volumetric capacity of the CWV 100 can be 7 $m^3$ per 100 meter length of the CWV 100 with a total depth of 1000 m, with an air pressure of 70 MPa and a temperature up to 200° C. In this example, the CWV 100 may store fluid with a pressure up to 100 MPa, such as up to 70 MPa. The amount of energy stored in the CWV 100 varies based on the volume and pressure of the CWV 100.

In order to increase the storage volume of CWV 100, the length L of the CWV 100 can be increased by deepening the wellbore 102, or a larger diameter casing 104 can be used, or both.

In some examples, multiple CWVs 100 may be installed to form a CWV array to collectively provide a cumulative storage capacity for fluid and energy storage. Any two adjacent CWV 100 in the CWV array are configured in fluid communication with each other through a surface manifold system. As well, the CWV array is highly scalable, as additional CWV units 100 can be added as needed. Individual CWVs 100 in an array can be configured for different use conditions, goals of the fluid storage, energy storage and power needs, and can store different fluids. The spacing between CWVs 100 in an array can be a function of conductive heat flux in the earth and the practical need for service trucks to independently access wellheads 110. In general, a compact array is preferred for heat conservation.

The design and configuration of a CWV 100 may vary for different fluids. For example, the oxygen in the compressed air and $H_2$ have different interactions with casing 104 and wellhead 110. In some examples, industry use guidelines with appropriate safety factors can be used to select grade of the steel and thickness of casing 104, quality of casing 104, basal plug 108, tubing 111, and top seal 112, to prevent or reduce undesired chemical reactions with the oxygen in the compressed air or $H_2$.

Although in the example of FIG. 2, the CWV 100 is vertical in orientation, the profile of the CWV 100 may be inclined or horizontal as required by a particular application. The volume and depth of the CWV 100 can vary accordingly. It is also possible to increase the storage volume of CWV 100 by installing CWVs 100 that turn to horizontal at depth and can therefore be of considerable length.

$H_2$ Storage in CWV 100

The present application discloses storing Compressed Gaseous (CG) $H_2$ inside the CWV 100 to improve the safety of storage $H_2$, mitigate storage vessel embrittlement, and provide for efficient energy storage in terms of high energy density per volume. CWV 100 utilizes a deep well(s) suitably drilled and completed with casing 104 into the ground to depths ranging up to several thousand meters. Since CWV 100 for $H_2$ storage is installed underground, it occupies a minimal surface footprint, leading to inconsequential damage on the surface in the event of a breach, and providing enhanced security from any adverse environmental and anthropogenic threats. As well, the installation of CWV 100 is not limited to particular geographic and geological conditions. Compressing the $H_2$ increases the volume density of $H_2$ and the corresponding energy density per volume.

In some examples, the fluid stored in the CWV 100 can be compressed gaseous $H_2$. The $H_2$ stored in the CWV 100 may have a pressure up to 110 MPa or more, such as from 20 MPa to 110 MPa, and a temperature up to 300° C., for example, from 15° C. to 300° C. The stored compressed H2 gas in the CWV 100 may have an energy density up to 3100 KWh/$m^3$ or more. In another example, the $H_2$ stored in the CWV 100 may have a pressure up to 70 MPa and a temperature up to 200° C. The stored compressed $H_2$ gas in the CWV 100 may have an energy density up to 2000 KWh/$m^3$. For example, $H_2$ may have a storage pressure between 25 MPa and 70 MPa and be stored in a form of compressed gaseous $H_2$, in a temperature ranging from 15 to 30° C. $H_2$ in these pressure and temperature ranges corresponds to an energy density range of 660-1960 kWh/$m^3$ For instance, as an example of the application, at temperature 27° C., the energy density of 941 kWh/$m^3$ is achievable at 35 MPa. The storage volume can vary depending on the volumetric capacity of the CWV 100 required for fluid storage. The energy density can vary depending on the pressure and temperature capacity of the CWV 100 required for fluid storage.

At temperature ranges of 200° C. or less, there are no obvious negative temperature impacts on the CWV 100, or significant degradation of steel properties of the CWV 100. Therefore, in this temperature range, the major constraint of the CWV 100 is the pressure that the CWV 100 is capable of sustaining without loss of integrity or plastic yield.

In some examples, The CWV 100 is configured to maintain $H_2$ inside the CWV 100 in a predetermined pressure range to prevent significant temperature rise and drop in the density of $H_2$, which can pose adverse effects to the structural integrity and energy storage efficiency. For example, at the same pressure, warm $H_2$ (such as 100° C.) has substantially less volumetric energy density than cool $H_2$ (such as 20° C.). A predetermined temperature range can be maintained by appropriate cooling of the compressed $H_2$ being injected into the CWV 100 to a predetermined temperature, so that the final temperature of the compressed $H_2$ gas does not exceed 250° C., when the CWV 100 is at its maximum storage pressure, such as 70 MPa or higher. As well, in the process of $H_2$ production or discharge from the CWV 100, expansion of the compressed $H_2$ in the CWV 100 can lead to cooling in the CWV 100. However, as the surrounding rock formation 101 is warm, and the heat of the rock formation 101 is conducted to the CWV 100, this allows for the ability to maintain a moderate temperature inside the CWV 100. As well, the cement 106 may be heat-insulating cement, as described above, with low thermal conductivity to ensure thermal insulation of stored $H_2$ inside the CWV 100. As such, $H_2$ inside the CWV 100 is maintained in a predetermined temperature range, and the density of the $H_2$ stored in the CWV 100 is not subjected to large temperature fluctuations that can affect the pressure, density, and energy density in $H_2$ stored in the CWV 100.

The CWV 100 for $H_2$ storage is configured in view of the small molecular size and low viscosity of $H_2$. Comparing $H_2$ to air, $H_2$ has a molecular size of 0.12 nm and an absolute viscosity at 20° C. of $0.88\times10^{-5}$ Pa·S. For reference, air has a molecular size of 0.33 nm and an absolute viscosity at 20° C. of $1.82\times10^{-5}$ Pa·s. In view of these attributes of $H_2$, the casing 104, the basal plug 108, the wellhead 110, the tubing 111, and the upper seal and valve 112 are made of metal to minimize $H_2$ diffusion through polymer or rubber seals (e.g. O-ring seals). In some examples, the exposed steel 104 of the CWV 100 and the wellhead 110 are made from a low-carbon, $H_2$-resistant steel not susceptible to hydrogen embrittlement, such as F22 steel or an appropriate alloy steel. Furthermore, the coupling and threading between the joints of casing 104 can be designed to mitigate H2 diffusion.

As well, $H_2$ can cause corrosion of metal. $H_2$ embrittlement may occur with high-strength steels, titanium, and some other metals. The mechanism of concern is when hydrogen is absorbed by solid metals. $H_2$ embrittlement can occur under different conditions such as high temperature, corrosion reactions, and operating with high-pressure $H_2$. Carbon steel embrittlement, also known as hydrogen-induced cracking (HIC), is another issue for $H_2$ storage. HIC occurs as $H_2$ permeates into steel (i.e., carbon steel and alloy steels) and induces reactions with iron carbides to form methane ($CH_4$). As the $CH_4$ accumulates, it exerts pressure on the metal causing high internal stresses which lead to metal embrittlement and cracking.

The CWV 100 is configured to use specially manufactured steels and steel alloys in the wellhead 110 and the steel-cased wellbore 102 to provide the resistance to hydrogen embrittlement necessary for secure operations. For example, the metallic components of the CWV 100, such as the casing 104, the basal plug 108, the wellhead 110, the tubing 111, and the upper seal and valve 112, may be made of a grade of steel that is not a carbon-based standard steel, or is made with epoxy and carbon-fibre components, or other suitable polymeric and strengthening agent composition that is free of metals.

The CWV 100 is configured to accommodate predetermined pressure and temperature conditions for a selected duration for hydrogen storage. The type of inner casing 104 and cement 106 can vary depending on the design specifications of the CWV 100 required for fluid storage In an example, if the casing 104 has a diameter of 30 cm and 1000 m length, the $H_2$ storage volume of CWV 100 is approximately 70 $m^3$. The quantity of $H_2$ that can be stored in CWV 100 is summarized in Table 1 below.

TABLE 1

$H_2$ Stored in a Single 1,000 m deep CWV with 70 $m^3$ @15° C.
Hydrogen energy density calculation

| | |
|---|---|
| Wellbore Volume | 70 m3 |
| Wellbore temperature | 15 degC. |
| R (constant) | 4124.2 J/(kg*K) |
| Specific energy (LHV) | 119.93 MJ/kg |

| Pressure (MPa) | Mass (kg) | Energy (MJ) | Energy (MWh) | Energy density (kWh/m3) | Energy density (kWh/kg) |
|---|---|---|---|---|---|
| 20 | 1178.1 | 141285 | 39.2 | 560.7 | 33.314 |
| 30 | 1767.1 | 211928 | 58.9 | 841.0 | 33.314 |
| 40 | 2356.1 | 282571 | 78.5 | 1121.3 | 33.314 |
| 50 | 2945.2 | 353214 | 98.1 | 1401.6 | 33.314 |
| 60 | 3534.2 | 423856 | 117.7 | 1682.0 | 33.314 |
| 70 | 4123.2 | 494499 | 137.4 | 1962.3 | 33.314 |
| 110 | 6479.4 | 777070 | 215.9 | 3083.6 | 33.314 |

The $H_2$ storage volume of CWV 100 can be increased by increasing the volume of CWV 100 as described above. The energy density can vary depending on the pressure and temperature capacity of the CWV 100 required for fluid storage.

The CWV 100, such as hydrogen storage **26*d* in FIG. 1, may be used for large-scale $H_2$ storage for a shipment (import and export) facility 34**, which may serve as a temporary storage of $H_2$ before it is shipped to the end-users.

The CWV 100, such as hydrogen storage **26*c* in FIG. 1, may be used for mid-scale storage at the nodes of $H_2$ transportation system such as terminals, pipelines and filling stations 32**.

As will be described in detail in view of FIGS. 3A-3C, the CWV 100, such as hydrogen storage **26*b* in FIG. 1, may be used for large-scale $H_2$ storage for a $H_2$ gas-to-power system, such as $H_2$ power plant 30 when CWV 100** is integrated with compressed air energy storage (CAES) system.

Combined Compressed H2 and Air Power System Using CWV 100

Figure 3A:
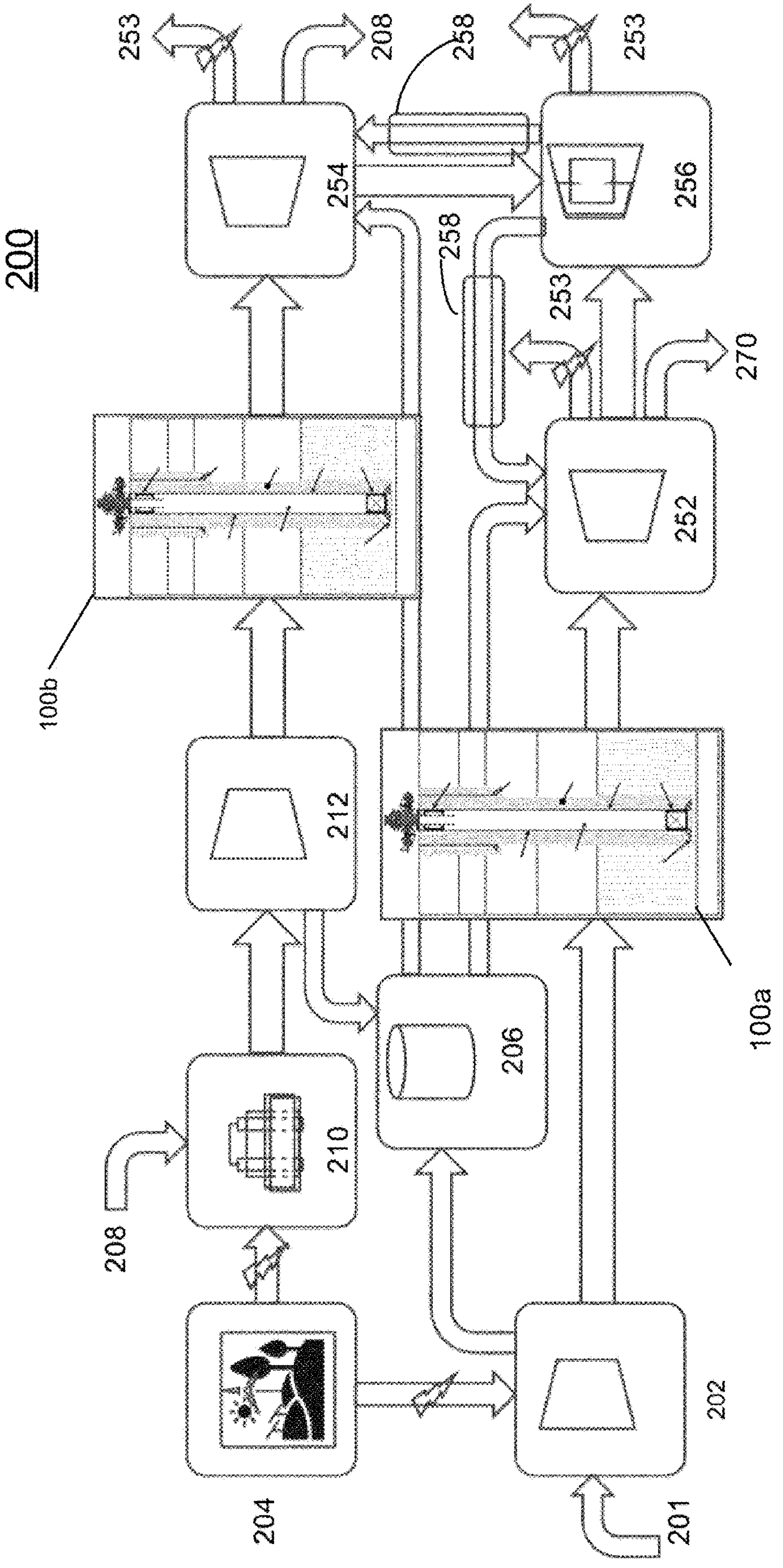
FIG. 3A is a diagram illustrating a system for a combined compressed hydrogen and air power system utilizing integrated energy storage, energy recovery and power generation, using the CWV fluid storage system in FIG. 2, according to example embodiments of the present application.
Figure 3B:
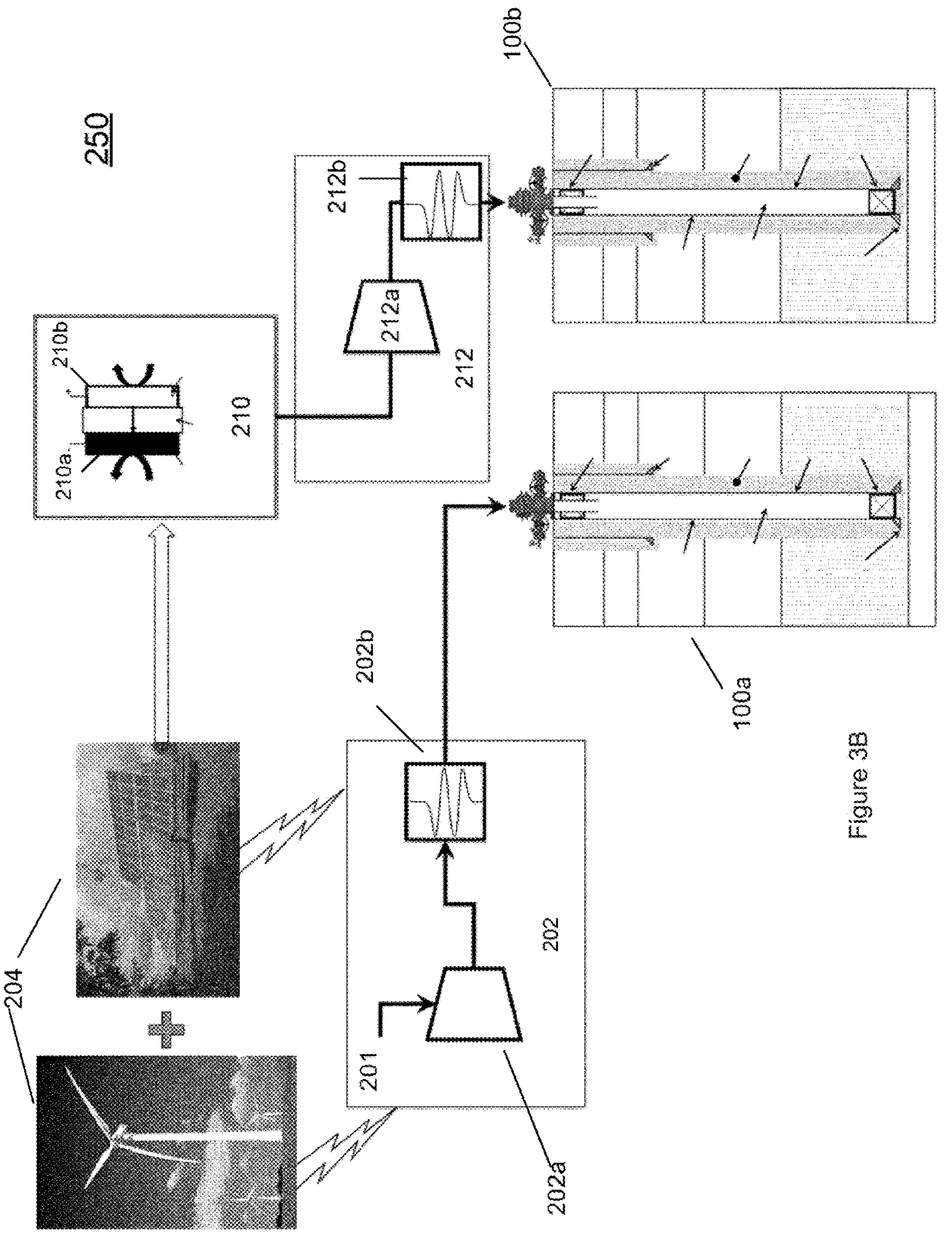
FIG. 3B is a diagram illustrating a more detailed exemplary system for Fluid and Energy Storage Train of the Compressed Hydrogen and Air Power System of the system in FIG. 3A.
Figure 3C:
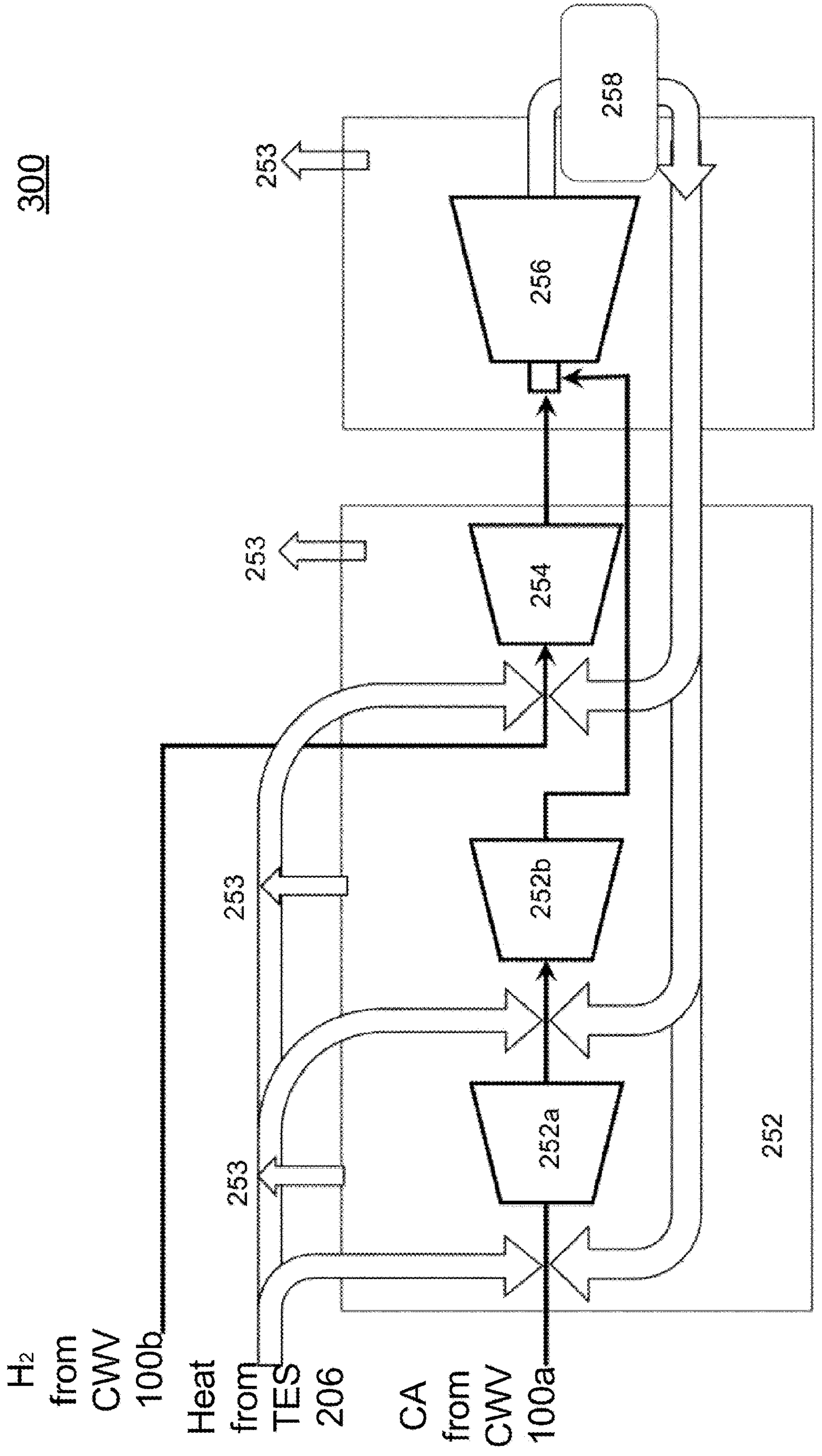
FIG. 3C is a diagram illustrating a more detailed exemplary system for Energy and Power Recovery Train of the Compressed Hydrogen and Air Power System of system in FIG. 3A.

Reference is made to FIGS. 3A-3C. FIG. 3A is a diagram illustrating an combined compressed hydrogen and air energy storage and recovery system 200 using the CWVs 100 to store fluid and energy, and to recover the energy stored in the CWVs 100 to generate electrical power, according to example embodiments of the present application. FIG. 3B illustrates a more detailed example of a system 250 for energy storage of the energy storage, energy recovery and power generation system 200. FIG. 3C illustrates a more detailed example of a system 300 for energy recovery of the energy storage, energy recovery and power generation system 200.

In the example of FIG. 3A, the system 200 is a combined compressed hydrogen and air power system utilizing integrated energy storage, energy recovery and power generation; and includes a first CWV 100*a* for storing energy in the form of compressed air, and a second CWV 100*b* for storing energy in the form of compressed gas $H_2$. In the example of FIG. 3A, the fluid stored in the CWV 100 includes compressed air stored in CWV 100*a* and compressed gas $H_2$ stored in CWV 100*b*. System 200 in FIG. 3A therefore includes both compressed air and compressed $H_2$ for the energy storage system and the energy recovery system to generate electrical power. In FIG. 3A, storing compressed air and $H_2$ in CWV 100, which tolerates high pressure and temperature, enhances the safety and security of energy storage and recovery, and reduces locational dependency and surface footprint. For example, CWV 100 can use repurposed old steel-cased wellbores, which are typically available in existing oil and gas fields, for compressed air and $H_2$ storage. Using existing wellbores can reduce the cost of system 200 or 250.

In FIG. 3A, the air 201 is compressed at a compression system 202, using a power source 204 such as renewable energy, to generate compressed air. In the example of FIG. 3B, the power source 204 may include wind and solar power. In the example of FIG. 3B, compression system 202 includes a compressor system 202*a* configured to compress air, and an inter-cooler system 202*b* configured to cool the compressed air to a predetermined temperature or temperature range. Multiple stages of compression and cooling may be required to compress the air. As such, the energy from the power source is stored in the compressed air. The compressed air is stored in one or more CWVs 100*a*. When more than one CWV 100*a* is used in system 200, the CWVs 100*a* may form an array as described above. The medium-grade heat generated in the compression process of air may be stored in a thermal energy storage system (TES) 206 and used to supply heat to the expansion system at the energy recovery stage.

In an example to provide a source for $H_2$, the power source 204 is used to electrolyze $H_2O$ 208 to generate $H_2$ in an electrolysis system 210. A compression system 212 is used to subsequently compress the generated $H_2$. As such, the energy from the power source 204 is converted to compressed $H_2$.

In the example of FIG. 3B, the electrolysis system 210 includes a cathode 210*a* and an anode 210*b*. Such electrolysis is well understood by persons knowledgeable with such process. The compressed $H_2$ is stored in one or more CWVs 100*b*. When more than one CWV 100*b* is used in system 200, the CWVs 100*b* may form an array as described above. The heat generated in the compression process of $H_2$ may be stored in the thermal energy storage (TES) 206. Heat generated from $H_2$ electrolysis (or other $H_2$ generation technology) can also be stored in TES 206.

In some examples, if all of the $H_2$ stored in the CWVs 100*b* is to be stored to generate electrical power, the ratio or volume of CWVs 100*a* storing compressed air and CWVs 100*b* storing $H_2$ can be determined stoichiometrically from the combustion needs, as air comprises approximately 19% oxygen.

Due to safety reasons, $H_2$ and compressed air are separately stored in different CWVs 100, such as 100*a* and 100*b*, and they are combined only at the combustion turbine 256 at the energy recovery stage.

In the example of FIG. 3B, the hydrogen compression system 212 includes a compressor 212*a* configured to compress $H_2$ generated from the electrolysis system 210 to a predetermined pressure, and an inter-cooler 212*b* configured to cool the compressed $H_2$ to a predetermined temperature or a temperature range before being injected into CWV 100*b*. Multiple stages of compression and cooling may be used to compress the hydrogen.

The CWV 100, 100*a* or 100*b* is configured to operably and securely store the fluid with a predetermined storage pressure or pressure range at a predetermined temperature or temperature range, for example by selecting appropriate location of the wellbore 102, appropriate properties and materials of the casing 104, the basal plug 108, the wellhead 110, and the top seal 112 to accommodate the chemical and physical properties of air, $H_2$ or $NH_3$ for the pressure and temperature conditions encountered. The storage pressure or pressure range is determined from the mass of the fluid, such as compressed air and $H_2$ to be stored, the existing regulatory guidelines, and the elements of the high-pressure casing available, using conventional oil and gas industry pressure and temperature design criteria. If old steel-cased wellbores are being repurposed for CWV 100, 100*a* or 100*b*, the pressure can be set based on a suitable energy analysis following condition assessment and pressure testing of the wellbore using well understood practice in the oil and gas industry. In some examples, the CWV 100 may be configured based on acceptable cyclic loading criteria, based on predicted service conditions of pressure and temperature history.

CWV 100 may also be used to store $H_2$ in a form of liquid $H_2$ and supercritical $H_2$.

In system 200, the energy stored in the compressed air in CWV 100*a* can be recovered by discharging the compressed high-pressure air stored in CWV 100*a* to an air expansion system 252 to drive the expansion system 252 to recover energy, such as by generating electrical energy/power 253. The air expansion system 252 may also discharge exhaust air 270. The air expansion system 252 may include two or more expander stages 252*a*, 252*b* that are mounted in series on a common power axle. In the example of FIG. 3C, the air expansion system 252 includes a high pressure compressed air turbine 252*a* and a low pressure compressed air turbine 252*b*. The high-pressure air discharged from CWV 100*a* is first input into high pressure compressed air turbine 252*a*. Expansion of the high pressure compressed air in the high pressure compressed air turbine 252*a* drives the high pressure compressed air turbine 252*a* and recovers energy stored in the compressed air, for example, by generating and outputting electrical energy/power 253. The pressure of the compressed air reduces because of expansion in the high pressure compressed air turbine 252*a*. The high pressure compressed air turbine 252*a* outputs the reduced pressure compressed air, which is input to the low pressure compressed air turbine 252*b* for further expansion in the low pressure compressed air turbine 252*b*. The expansion of the reduced pressure compressed air in the low pressure compressed air turbine 252*b* drives the low pressure compressed air turbine 252*b* to further recover the energy stored in the reduced pressure compressed air, for example by generating and outputting electrical energy/power 253. In each expansion stage, a certain air mass flow rate needs to be maintained depending on the required output of electrical energy/power 253.

As illustrated in FIGS. 3A and 3C, the energy stored in the compressed high pressure $H_2$ in CWV 100*b* can be recovered by discharging the compressed high pressure $H_2$ gas in the CWV 100*b* to a $H_2$ expansion system 254, which may include a $H_2$ turbine, for example, to drive the expansion system 254 to recover energy, such as by generating and outputting electrical energy/power 253. $H_2$ expansion system 254 may be run simultaneously with the air expansion system 252. The pressure of the compressed $H_2$ reduces because of expansion in the $H_2$ expansion system 254. The $H_2$ expansion system 254 outputs the reduced pressure compressed $H_2$. The expansion system 254 also outputs $H_2O$ 208.

Multiple stages of expansion may be required for energy recovery from the compressed hydrogen gas or liquid hydrogen. In each expansion stage, a certain hydrogen gas or liquid mass flow rate needs to be maintained depending on the required output of electrical energy/power 253.

As well, the low-pressure air output from the air expansion system 252 in FIG. 3A or from the low pressure compressed air turbine 252*b* in FIG. 3C as the oxidant, and the low-pressure $H_2$ output from the expansion system 254 can, at a predetermined ratio, input to a $H_2$ combustion turbine 256 for combustion. In some examples, the pressure of the lower pressure air and the low pressure $H_2$ is about 4 MPa. The heat of combustion drives the turbine 256 to further recover the energy from combustion of $H_2$, such as by generating and outputting electrical energy/power 253 using the energy generated from combusting the $H_2$ in the combustion turbine 256. The high-grade heat generated in the combustion process may be used, via an Organic Ranking Cycle (ORC) 258, a Kalina Cycle system, or a thermoelectric system, to provide heat to the air expansion system 252, the high pressure compressed air turbine 252*a*, the low pressure compressed air turbine 252*b* and/or the $H_2$ expansion system 254, or to be stored in the TES 206.

The amount of energy derived from the compressed air and compressed $H_2$ is dependent on mass flow through the air expansion system 252 and the $H_2$ expansion system 254, which output energy proportional to the mass flux and $\Delta p$ through the air expansion system 252 and the $H_2$ expansion system 254. Due to the molecular characteristics of air and $H_2$, the energy from expanding the air is generally greater than the energy from expanding $H_2$.

The system 300 for energy recovery can be optimized to ensure that sufficient energy is extracted during the expansion process and sufficient amounts of compressed air and $H_2$ are available for the combustion process.

In some examples, the system 200 is an adiabatic system. For example, the heat stored in the TES 206 may be used to supply heat to the air expansion system 252, the high pressure compressed air turbine 252*a*, the low pressure compressed air turbine 252*b* and/or the $H_2$ expansion system 254. Heat stored in TES 206 may eliminate or reduce the need for external sourced fuel in system 300 for energy recovery.

In addition to turbines, the air expansion system 252 and $H_2$ expansion system 254 can also be reciprocating engines, such as piston expanders.

Ammonia ($NH_3$) Storage in CWV 100

In some examples, the fluid stored in the CWV 100 can be ammonia ($NH_3$) fluid, which includes liquefied or compressed gaseous $NH_3$. $NH_3$ can be liquefied by compression. Liquid or gaseous $NH_3$ stored with CWV 100 can act as a secure and scalable long-term energy storage. For instance, at 50° C., $NH_3$ liquefies at approximately 2 MPa. $NH_3$ liquid has a higher volumetric energy density than gaseous $NH_3$. Converting $H_2$ and storing it in a form of $NH_3$ can mitigate the issue of the low volumetric energy density of $H_2$. For instance, liquid $NH_3$ at 25° C. and 1 MPa contains energy density of 4.33 $MWh/m^3$; $H_2$ at cryogenic temperature and compressed gaseous $H_2$ at 70 MPa contains energy density of 2.53 $MWh/m^3$ and 1.56 $MWh/m^3$, respectively (see Table 2 below). This property of $NH_3$ allows it to be more transportable and storable compared to $H_2$, albeit at a lower specific energy than $H_2$. Specific energy refers to the energy density value per mass (MJ/kg or KWh/kg). Hence the $NH_3$ is a 'hydrogen carrier' and is a safe and effective means of handling and storing $H_2$; the $NH_3$ fluid storage in CWV 100 also effectively stores hydrogen energy.

Therefore, to enhance storability and transportability, $H_2$ can be converted into $NH_3$ by synthesizing with $N_2$ withdrawn from the atmosphere. Such catalytic reaction of $N_2$ and $H_2$ is called the Haver-Bosch process:

$$N_2 (g) + 3H_2 (g) \text{->} 2NH_3 (g)$$

Figure 4:
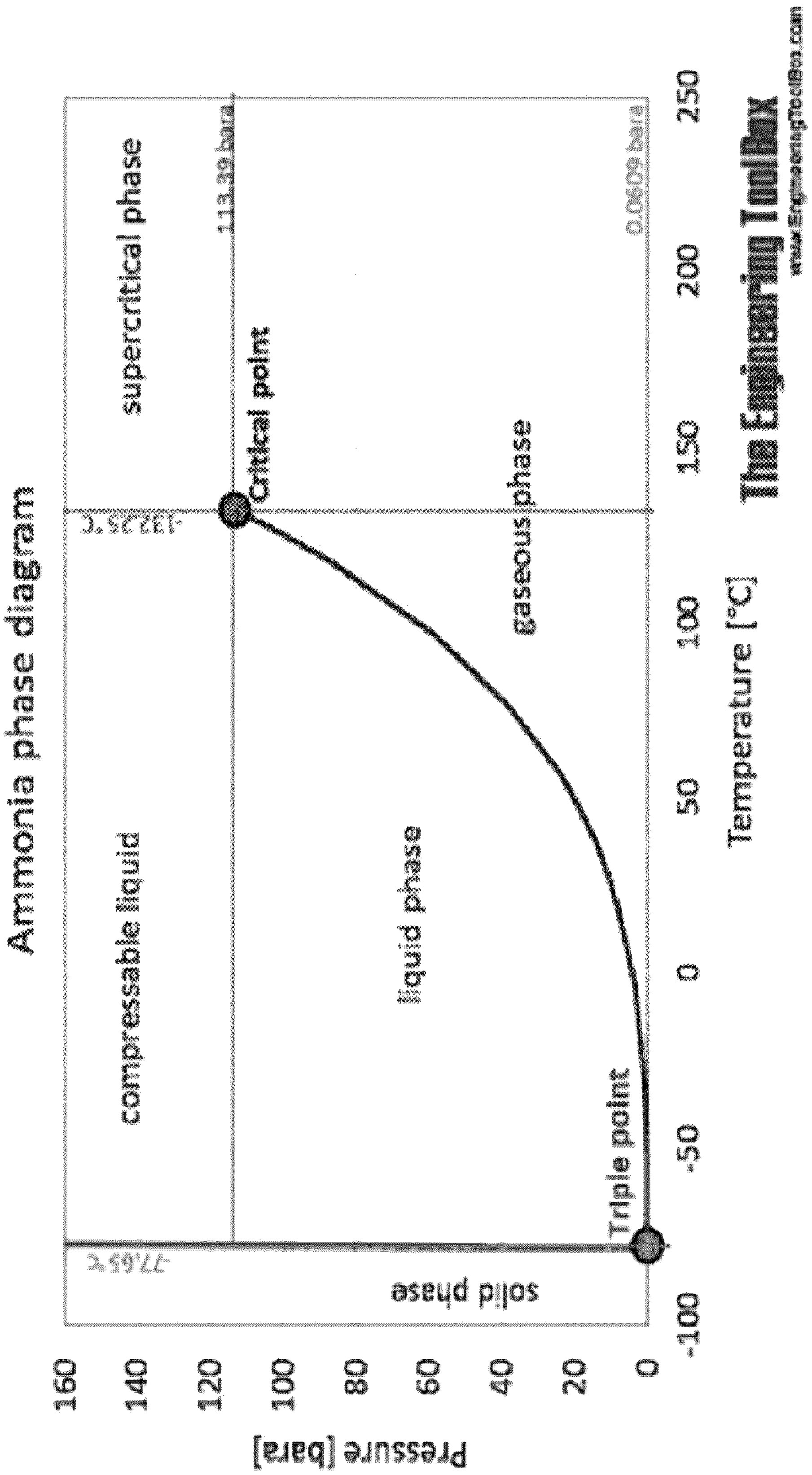
FIG. 4 is a diagram illustrating different phases of ammonia in view of pressure and temperature.

The produced $NH_3$ is further compressed until it is liquefied. For instance, as illustrated in FIG. 4, at 50° C., $NH_3$ liquefies at approximately 2 MPa. Storing liquid $NH_3$ in the CWV 100, instead of gaseous $NH_3$, increases the volumetric energy density of $NH_3$ in CWV 100.

$NH_3$ has a relatively high coefficient of thermal expansion. It is desired to maintain relatively constant temperature to prevent overpressure developing within the CWV 100. $NH_3$ also exhibits a strong propensity for reacting with water, generating ammonium hydroxide ($NH_4OH$). Although $NH_4OH$ does not damage the structural integrity of CWV 100, it may have adverse impacts on the quality of the stored $NH_3$, hence anhydrous storage is desired.

Overall, storing $NH_3$ using CWV 100 has several advantages. For example, it is a safer and more energy efficient way to store $H_2$. As well, $NH_3$ can also absorb substantial amounts of heat from its surroundings, for example, one gram of $NH_3$ absorbs 327 calories of heat, and therefore $NH_3$ can be used as a heat storage medium 206 for compressed energy storage systems 202 and 212. In this regard, the cement 106 of the CWV 100 may be heat-insulating cement to preserve the heat absorbed by $NH_3$. As such, the $NH_3$ or $H_2$ stored in CWV 100 can be an integrated adiabatic energy storage system and a $NH_3$ or $H_2$ storage system. In addition, $NH_3$ is relatively easy to store compared to $H_2$. Based on mass calculations, $NH_3$ has a lower mass energy density over $H_2$ due to the additional mass of the N in $NH_3$. However, as illustrated in FIG. 4, the advantage of $NH_3$ is that liquid $NH_3$ in CWV 100 at 50° C. only requires a pressure of 2 MPa to keep $NH_3$ as a liquid. Therefore, the integrity of CWV 100 induced by pressure and temperature of storing liquid $NH_3$ is easier to achieve with respect to storing compressed gaseous $H_2$.

Using CWV 100 to store $NH_3$ is safer than using surface storage vessels.

Metal embrittlement by $NH_3$ does not occur in carbon steels. As illustrated In FIG. 4, $NH_3$ can be stored as a stable liquid at moderate pressures and temperatures, for example, from 25° C. to 100° C. and from 1 MPa to 6 MPa. As also illustrated in FIG. 4, $NH_3$ can also be stored as a gas at certain pressures and temperatures.

The CWV 100 is configured to accommodate predetermined pressure and temperature conditions for a selected duration for $NH_3$ storage. The total energy of liquid $NH_3$ (25° C., 1 MPa) that can be stored in CWV 100 with a storage volume of 70 $m^3$ is summarized in Table 2 and compared to liquid hydrogen ($LH_2$) (cryogenic) and compressed gaseous $H_2$ (CG $H_2$) at 70 MPa. Note that volumetric energy densities of 4.3 $MWh/m^3$, 2.5 $MWh/m^3$, and 1.6 $MWh/m^3$ are considered for liquid $NH_3$, liquid hydrogen and CG $H_2$, respectively. The storage volume can vary depending on the volumetric capacity of the CWV 100 required for fluid storage. The energy density can vary depending on the pressure and temperature capacity of the CWV 100 required for fluid storage.

TABLE 2

Stored Energy of $NH_3$, L $H_2$ and CG $H_2$ in a Single 1,000 m deep, 70 $m^3$ CWV 100

| Fluid | Energy density ($MWh/m^3$) | Total energy (MWh) |
|---|---|---|
| Liquid $NH_3$ | 4.3 | 301 |
| L $H_2$ | 2.5 | 175 |
| CG $H_2$ | 1.6 | 112 |

Figure 5:
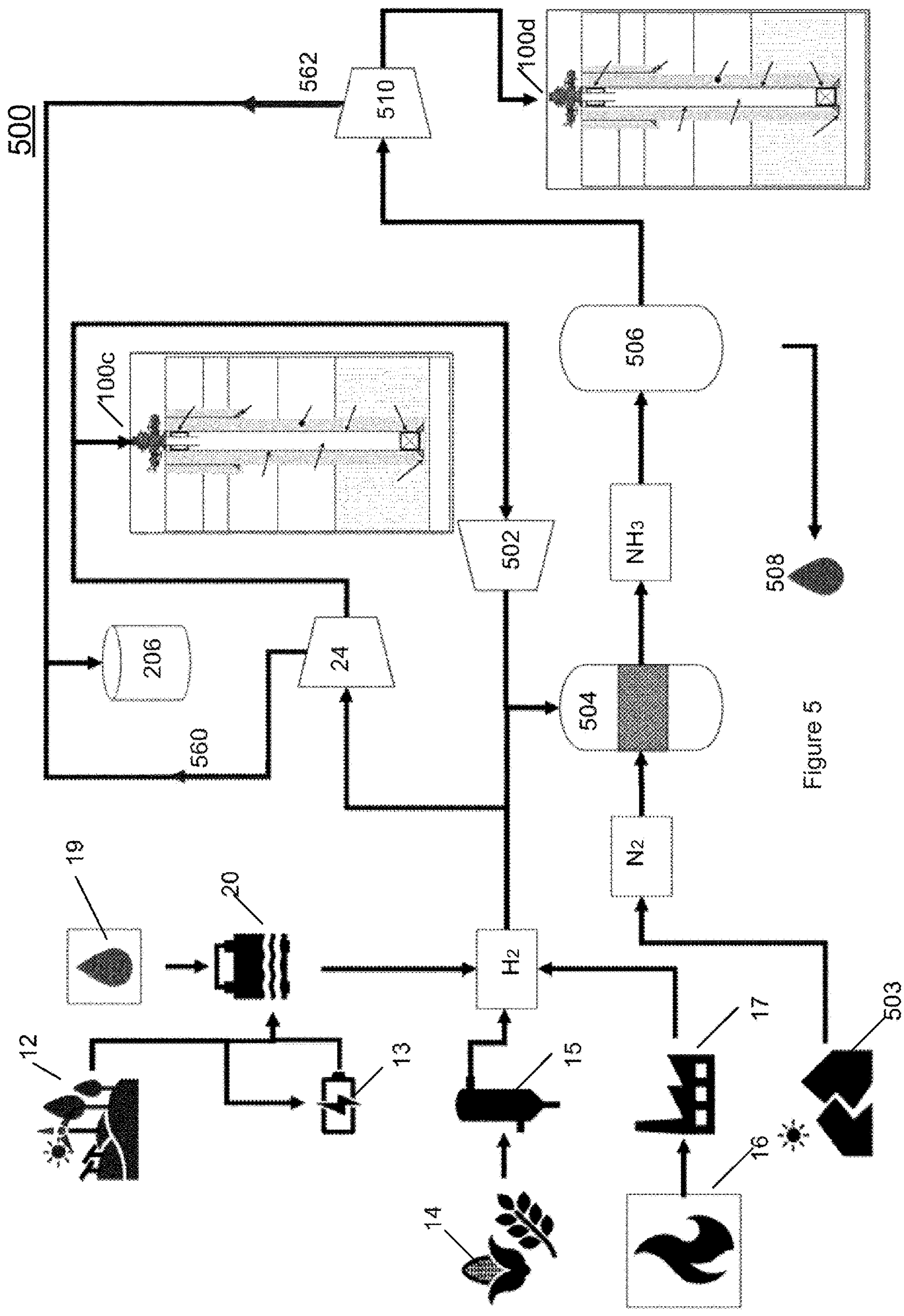
FIG. 5 is a diagram illustrating Storing Compressed Hydrogen and Ammonia in the CWS system in the hydrogen and ammonia supply chain, according to another example embodiment of the present application.

FIG. 5 is an example illustrating a fluid storage system 500 for storing compressed gaseous $H_2$ and liquid $NH_3$ using the CWV 100 in FIG. 2, according to another example embodiment of the present application to the hydrogen and ammonia supply chain.

As illustrated in the examples of FIG. 1 and FIG. 5, $H_2$ can be generated in various manners. In the example of FIG. 5, $H_2$ and $O_2$ can be generated by an electrolysis process 20 by electrolyzing water 19, using energy generated from renewable energy sources 12, such as solar, wind, etc., or energy stored in a short-term energy storage system 13, such as a battery. $H_2$ can also be generated from biogas 14 using a pyrolysis or gasification process 15. As well, $H_2$ can be generated from a steam methane reforming process 17 by natural gas 16, or coal and other fossil fuels. In some examples, the $CO_2$ generated using reforming process 17 is sequestered using carbon capture and storage (CCS) technology.

The generated $H_2$ may be compressed or liquefied using a compression or liquefaction process 24. The compressed or liquefied $H_2$ may be stored at one or more CWV 100C, the same as CWV 100 as described above. The heat 560 generated in the compression process 24 of $H_2$ may be stored in the thermal energy storage (TES) 206.

In the example of FIG. 5, $N_2$ is withdrawn from the atmospheric air 503 and transported to a reactor 504. The compressed $H_2$ is transported to the reactor 504. With the compressed $H_2$ and the $N_2$, the reactor 504 synthesizes $NH_3$ using a catalytic reaction at high temperature and pressure, such as 450° C. and 30 MPa. Optionally, the synthesized $NH_3$ is purified using a purification process 506, and impurities or contaminants 508 are removed from $NH_3$ to avoid undesired reactions with the storage vessel which may be detrimental to the structural integrity of the storage vessel; $NH_3$ may corrode the storage vessel and result in corrosion cracking. Since $NH_3$ forms a base, it does not corrode steel or steel alloys. The main cause of the corrosion is impurities or contaminants contained in the $NH_3$. Contaminants in the $NH_3$, such as oxygen or other compounds, are removed or controlled by a purification process 506. In an example, pure $NH_3$ with small amounts of water ($H_2O$), such as 50 ppm, is non-corrosive to iron and non-reactive with all iron components in CWV 100.

Purified $NH_3$ is compressed at a compressor 510 to a predetermined pressure or pressure range, the compressed $NH_3$ or liquid $NH_3$ is cooled to a predetermined temperature or temperature range and output from the compressor 510 is injected in CWV 100*d* for storage. The heat 562 generated in the compression process 510 may be stored in the thermal energy storage (TES) 206 for later use.

In some examples, liquid $NH_3$ is stored in CWV 100*d* has a pressure up to 50 MPa and a temperature up to 130° C., such as from 20° C. to 130° C., and the stored $NH_3$ has an energy density up to maximum 3370 $KWh/m^3$.

In some examples, gaseous $NH_3$ is stored in CWV 100*d* at a pressure up to 11 MPa and a temperature up to 250° C., such as from 20° C. to 250° C., and wherein the stored liquid gaseous $NH_3$ has an energy density up to 300 $KWh/m^3$.

In some examples, an effective volume capacity of the CWV 100*d* is 1-20 $m^3$/100 meter of well length L, and a total volume of the CWV 100*d* is 50-250 $m^3$.

In the present application, the materials of for constructing CWV 100, such as casing 104, wellhead 110, etc., are selected, as described above, to prevent any chemical interactions with $H_2$ and $NH_3$ that can be detrimental to the wellbore integrity. Furthermore, the CWV 100 is designed or configured to accommodate the duration and pressure and temperature conditions for hydrogen gas storage and ammonia fluid storage including to mitigate heat loss from the well, mitigate steel embrittlement and hydrogen-induced cracking of the steel casing, and reduce gas leakage in the casing couplings/thread.

In some examples, subsequent to CWV 100 storage, if $H_2$ in the form of $NH_3$ is to be used in a hydrogen-based fuel cell (indirect oxidation), the $NH_3$ can be converted back to separate constituents N and $H_2$ as needed, for example, by using a "reforming" process achieved by various methods involving high temperature electrolytes and catalysts. $H_2$ component can then be used in a variety of applications (e.g., such as combustion processes and for fuel cell use).

In some examples, the energy stored as $H_2$ in a CWV 100*c* and as $NH_3$ in a CWV 100*d* may be recovered as electrical energy/power 253 by using an energy recovery system similar to system 300 described above.

In some examples, $NH_3$ stored in the CWS can be used directly as a fuel through an ammonia combustion process. To effectively use $NH_3$ as a fuel, large-scale energy storage is also a key, using deep wells with CWS. In the present application, deep wells refers to a CWV having a depth of over 100 meters.

Certain adaptations and modifications of the described embodiments can be made. Therefore, the above discussed embodiments are considered to be illustrative and not restrictive.

What is claimed is:

1. A system for fluid storage, comprising:

a first cased-wellbore vessel (CWV) provided in a subsurface comprising a surrounding rock formation, the surrounding rock formation having geomechanical properties that provide stiffness and in situ confining stress to the first CWV, the first CWV comprising a casing cemented to the surrounding rock formation for providing in situ confinement from the surrounding rock formation due to stiffness of the surrounding rock formation; and a fluid comprising a compressed gas or liquid stored in the first CWV, wherein the casing is made of low-carbon and H2-resistant steel, with effect that the first CWV stores the compressed gas at a pressure up to 110 MPa and a temperature up to 300° C.

2. The system of claim 1, wherein the fluid comprises compressed hydrogen gas having a pressure up to 110 MPa, a temperature from 15° C. to 300° C., and an energy density up to 3100 $KWh/m^3$.

3. The system of claim 1, wherein the fluid comprises ammonia liquid or ammonia gas.

4. The system of claim 2, further comprising:

a second CWV provided in the subsurface comprising the surrounding rock formation, the surrounding rock formation having geomechanical properties that provide stiffness and in situ confining stress to the second CWV; and the fluid further comprising ammonia liquid or gas stored in the second CWV at a pressure up to 50 MPa and a temperature from 20° C. to 250° C.

5. The system of claim 4, further comprising:

a third CWV provided in the subsurface comprising the surrounding rock formation, the surrounding rock formation having geomechanical properties that provide stiffness and in situ confining stress to the third CWV; and the fluid further comprising compressed air stored in the third CWV.

6. The system of claim 3, wherein the ammonia liquid is stored in the first CWV, and has a pressure up to 50 MPa and a temperature from 20° C. to 130° C., and wherein the ammonia liquid has an energy density up to 3370 $KWh/m^3$.

7. The system of claim 4, wherein ammonia gas is stored in the second CWV, and has a pressure up to 11 MPa and a temperature from 20° C. to 250° C., and wherein the ammonia gas has an energy density up to 300 $KWh/m^3$.

8. The system of claim 5, wherein each of the first CWV, second CWV, and third CWV defines a volumetric space for storing the fluid that is generated from a renewable energy source.

9. The system of claim 5, wherein one or more of the first CWV, the second CWV, and the third CWV store at least a portion of heat generated in a compression process of the fluid, for heating the fluid in a subsequent expansion process for generation of electrical energy.

10. The system of claim 8, wherein an effective volume capacity of the first CWV, the second CWV, and the third CWV is 1-20 $m^3$/100 meter of a length of the first CWV, the second CWV, or the third CWV.

11. The system of claim 10, wherein a total volume of the first CWV, the second CWV, or the third CWV is 50-250 $m^3$.

12. The system of claim 8, wherein the first CWV comprises:

a basal plug fluid-tightly mounted at a bottom end of the casing;

a wellhead fluid-tightly mounted at a top end of the casing;

a tubing fluid-tightly connected to the wellhead; and a top seal and valve installed between the tubing and a top portion of the casing, wherein the basal plug, the wellhead, the tubing, and the top seal and valve are made of the low-carbon and H2-resistant steel; and at least one gas flow regulator sealed at a top end of the casing for selectively injecting the fluid into the volumetric space or discharging the fluid from the volumetric space.

13. A system for energy storage and energy recovery and generating electrical power, comprising:

two or more cased-wellbore vessels (CWVs) provided in a subsurface for separately storing compressed air and compressed hydrogen gas or ammonia fluid; and an integrated expansion and combustion system provided at a surface in sealed, fluid communication with the two or more CWVs for generating electrical power from a sequential expansion of the compressed air and the compressed hydrogen gas or ammonia fluid, and subsequent combustion of the compressed hydrogen gas or ammonia fluid, said expansion and combustion system comprising a combustion turbine for generating electrical power using energy generated from the combustion of the compressed hydrogen gas or ammonia fluid.

14. The system of claim 13, wherein the subsurface comprises surrounding rock formation having geomechanical properties that provide stiffness and in situ confining stress to the two or more CWVs, wherein each of the two or more CWVs comprising a casing cemented to the surrounding rock formation, the casing defining a volumetric space for storing the compressed air, or the compressed hydrogen gas or ammonia fluid.

15. The system of claim 13, wherein any two adjacent energy storage vessels of the two or more CWVs storing the compressed air are in fluid communication with each other, or any two adjacent energy storage vessels of the two or more CWVs storing the compressed hydrogen gas or ammonia fluid are in fluid communication with each other.

16. The system of claim 15, wherein the two or more CWVs in fluid communication with each other form an array that collectively provides a cumulative storage capacity for energy storage.

17. The system of claim 13, wherein the expansion and combustion system comprises a first expansion system for receiving compressed air for energy recovery and generating electricity, and a second expansion system for receiving the compressed hydrogen gas or ammonia fluid for energy recovery and generating electricity.

18. The system of claim 17, wherein the compressed air is heated at least in part in the first expansion system and the compressed hydrogen gas or ammonia fluid in the second expansion system is heated at least in part using a portion of heat stored in the two or more CWVs.

19. The system of claim 17, wherein the expansion and combustion system further comprising a combustion system, wherein the compressed hydrogen gas discharged from the second expansion system and the compressed air discharged from the first expansion system are discharged to the combustion system to burn the hydrogen gas for generating electricity.

20. The system of claim 19, wherein heat generated from the combustion system is used to heat at least in part the compressed air in the first expansion system and the compressed hydrogen gas or ammonia fluid in the second expansion system.

21. The system of claim 13, wherein each of the two or more CWVs further comprises at least one gas flow regulator for selectively injecting compressed air, compressed hydrogen, or ammonia fluid into the two or more CWVs or discharging the compressed air, compressed hydrogen, or ammonia fluid from the two or more CWVs at a predetermined mass flow rate for generating electrical energy in the expansion and combustion system.

22. The system of claim 13, wherein the two or more CWVs are used in an adiabatic system for generation of electrical energy and power.

23. The system of claim 13, wherein the ammonia fluid is purified to remove impurities or contaminants before being stored.

24. The system of claim 23, wherein the two or more CWVs are configured to structurally maintain an integrity of the two or more CWVs for the duration and pressure and temperature conditions for compressed hydrogen fluid storage and ammonia fluid storage, and to mitigate heat loss from the two or more CWVs, mitigate steel embrittlement and hydrogen-induced cracking of steel casings of the two or more CWVs, reduce gas leakage in casing couplings/threads of the two or more CWVs and reduce effects of corrosion.

* * * * *